(12) United States Patent
Mouille

(10) Patent No.: US 6,200,097 B1
(45) Date of Patent: Mar. 13, 2001

(54) HUB FOR ROTOR HEAD OF ROTARY-WING AIRCRAFT AND ROTOR HEAD WITH SUCH HUB

(76) Inventor: René Mouille, 7 Chemin du Moulin de Testas, 13090 Aix en Provence (FR)

( * ) Notice: Subject to any disclaimer, the term of this patent is extended or adjusted under 35 U.S.C. 154(b) by 0 days.

(21) Appl. No.: 09/171,533
(22) PCT Filed: Mar. 4, 1998
(86) PCT No.: PCT/FR98/00418
  § 371 Date: Oct. 21, 1998
  § 102(e) Date: Oct. 21, 1998
(87) PCT Pub. No.: WO98/39206
  PCT Pub. Date: Sep. 11, 1998

(30) Foreign Application Priority Data

Mar. 6, 1997 (FR) .................................................. 97 02667

(51) Int. Cl.⁷ .................................................. B64C 27/51
(52) U.S. Cl. ...................... 416/107; 416/140; 416/244 R
(58) Field of Search .................... 416/106, 107, 416/134 A, 140, 244 R, 244 C, 244 D, 141

(56) References Cited

U.S. PATENT DOCUMENTS

| | | | |
|---|---|---|---|
| 4,732,540 | * 3/1988 | Mouille et al. | 416/134 |
| 5,116,209 | * 5/1992 | Anglade et al. | 416/107 |
| 5,267,833 | * 12/1993 | Mouille | 416/107 |
| 5,906,476 | * 5/1999 | Arlton | 416/114 |

FOREIGN PATENT DOCUMENTS

| | | |
|---|---|---|
| 3510073 | 9/1986 | (DE) . |
| 2671049 | 7/1992 | (FR) . |
| 2689483 | 10/1993 | (FR) . |

OTHER PUBLICATIONS

D. Braun, et al.: "FEL—A New Main Rotor System" Vertica, vol. 14, No. 1, Jan. 1, 1990, pp. 47–60, XP000099607, see p. 48–p. 49, see figures 2,23.

* cited by examiner

Primary Examiner—Edward K. Look
Assistant Examiner—Hermes Rodriguez
(74) Attorney, Agent, or Firm—Stevens, Davis, Miller & Mosher, L.L.P.

(57) ABSTRACT

A hub for the rotor head of a rotary-wing aircraft having a plurality of blades radially linked to the hub by a blade root provided with a rigid hub includes spherical stops associated with the blades, which stops have an inner armature linked to the root of the blade and an outer armature linked to the hub. The hub includes an upper plate and a lower plate formed of two separate components which are assembled with an outer armature of spherical stops being interposed therebetween, so that the spherical stops are housed in the space defined by the plates. The outer armature is arranged at the periphery of the plates so that a hollow hub is obtained without requiring a sidewall with apertures, so as to facilitate the mounting and/or removal of the blades and the spherical stops. The plates may have a triangular shape with cutoff corners wherein a plurality of outer armatures is arranged near the cut-off corner.

14 Claims, 4 Drawing Sheets

HUB FOR ROTOR HEAD OF ROTARY-WING AIRCRAFT AND ROTOR HEAD WITH SUCH HUB

BACKGROUND OF THE INVENTION

1. Field of the Invention

The present invention relates to a hub for the rotor head of a rotary-wing aircraft, as well as to a rotor head including such a hub.

2. Description of the Related Art

A hub for the rotor head of a rotary-wing aircraft is already known from French patent FR-A-2 671 049, the rotor comprising at least two blades each of which is linked radially to said hub by a blade root provided with a rigid loop constituting the attachment of the blade onto said hub, said hub carrying laminated spherical stops, each of which is associated with one blade and comprises, between an outer armature rigidly linked to said hub and an inner armature linked to the root of said blade, an alternating stack of rigid cups and layers of an elastic material in the form of spherical portions having a common center, each laminated spherical stop, for the associated blade, constituting an element for retaining on said hub and a single articulation in flapping, drag and pitch, and said rigid loop of a blade surrounding the associated laminated spherical stop and being integral with the inner armature of this latter stop.

In the above document, said hub takes the form of a single-piece cage provided with a thin sidewall, of substantially cylindrical shape, including at least as many apertures as there are blades, each aperture having dimensions which are sufficient for at least the passage and the flapping of the laminated spherical stop of the corresponding blade.

Hence, with such a known hub, in the production of the rotor head, it is necessary to integrate each spherical stop of a rigid loop with the associated blade, then to insert the stops, thus integrated with their blades, through said apertures into said cage and, finally, to fix the stops to the hub. It can easily be imagined that this gives rise to difficult handling, adjustment and assembly operations.

In order to facilitate these operations, thought has already been given to providing intermediate linking sleeves between said stops and said blades, each of said sleeves, at one end, carrying the rigid loop, and, at the other end, carrying fixing means for the root of a blade. Hence, the blades can be mounted on the rotor head only after the linking sleeves have been mounted in the hub, which facilitates the complete mounting of the rotor head, but entails the supplementary components which are said linking sleeves.

SUMMARY OF THE INVENTION

The purpose of the present invention is to remedy these drawbacks of the prior art. The present invention relates to a hub of the type reiterated above, facilitating mounting of the rotor head, but without requiring linking sleeves between the hub and the blades.

To this end, according to the invention, the hub for a rotor head of a rotary-wing aircraft, of the type reiterated above, is noteworthy in that it comprises an upper plate and a lower plate forming two separate components assembled to one another with the outer armatures of the spherical stops being interposed, in such a way that said plates are spaced from one another and define between them a space in which the spherical stops are housed, said outer armatures being arranged at the periphery of said plates and being traversed by fixing means integrating together said plates and said spherical stops.

Hence, by virtue of the present invention, a hollow hub is obtained, without a sidewall with apertures, the internal space of which is accessible from the top, when the upper plate is dismantled, in order to facilitate the mounting and/or removal of the blades and of the spherical stops which are associated with them. That being so, it is possible to dispense with the linking sleeves and to use blades which are of a single piece with the blade root loop.

It will be noted moreover that, by virtue of the present invention, a particularly compact and particularly light hub is obtained, in which the spherical stops can be brought as close as possible to the center of the hub, since no drive shaft is located within the latter.

Advantageously, provision is further made for spacers arranged at the periphery of said plates, between said outer armatures, and made integral with said plates.

In the particular case in which the hub in accordance with the present invention is intended for a 3-blade rotor head, it is advantageous for said plates each to exhibit the general shape of a triangle with cut-off corners, and for each of said outer armatures to be located in the vicinity of a cut corner, while said spacers are arranged along the sides of said triangles.

In order to allow the spherical stops to flap downward, as well as to make available a very strong rigid part for fixing the hub to the shaft of the rotor, it is advantageous for said lower plate to include a bowl-shaped central part open toward said upper plate, and a peripheral rim on which said outer armatures of said stops, and possibly said spacers, are mounted.

This central bowl-shaped part may be substantially frustoconical.

Likewise, in order to allow upward flapping of the inner armatures of the spherical stops while avoiding giving said hub too great a height, it is advantageous for said upper plate to be hollowed out centrally, opposite said lower plate.

The upper and lower plates may be produced from light alloy or a composite material.

The present invention also relates to a rotor head for a rotary-wing aircraft including a hub in accordance with the invention, as mentioned above.

In such a hub head, it is advantageous for each blade lever to consist of two plates arranged on either side of said blade root and fixed thereto.

In a known way, the rotor head in accordance with the invention may include drag dampers. The latter may be mounted either between two consecutive blades or between each blade and said hub.

In the first case, it is advantageous for each drag damper to be mounted between the blade levers of the two consecutive blades. In the second case, it is advantageous for said spacers to include an attaching lug for such a drag damper, so that each of said dampers links the lever of a blade to one such attaching lug integral with the hub.

BRIEF DESCRIPTION OF THE DRAWINGS

The description which will follow, accompanied by the attached drawings, will give a good understanding of how the invention can be produced.

DETAILED DESCRIPTION OF THE PREFERRED EMBODIMENTS

Figure 1:
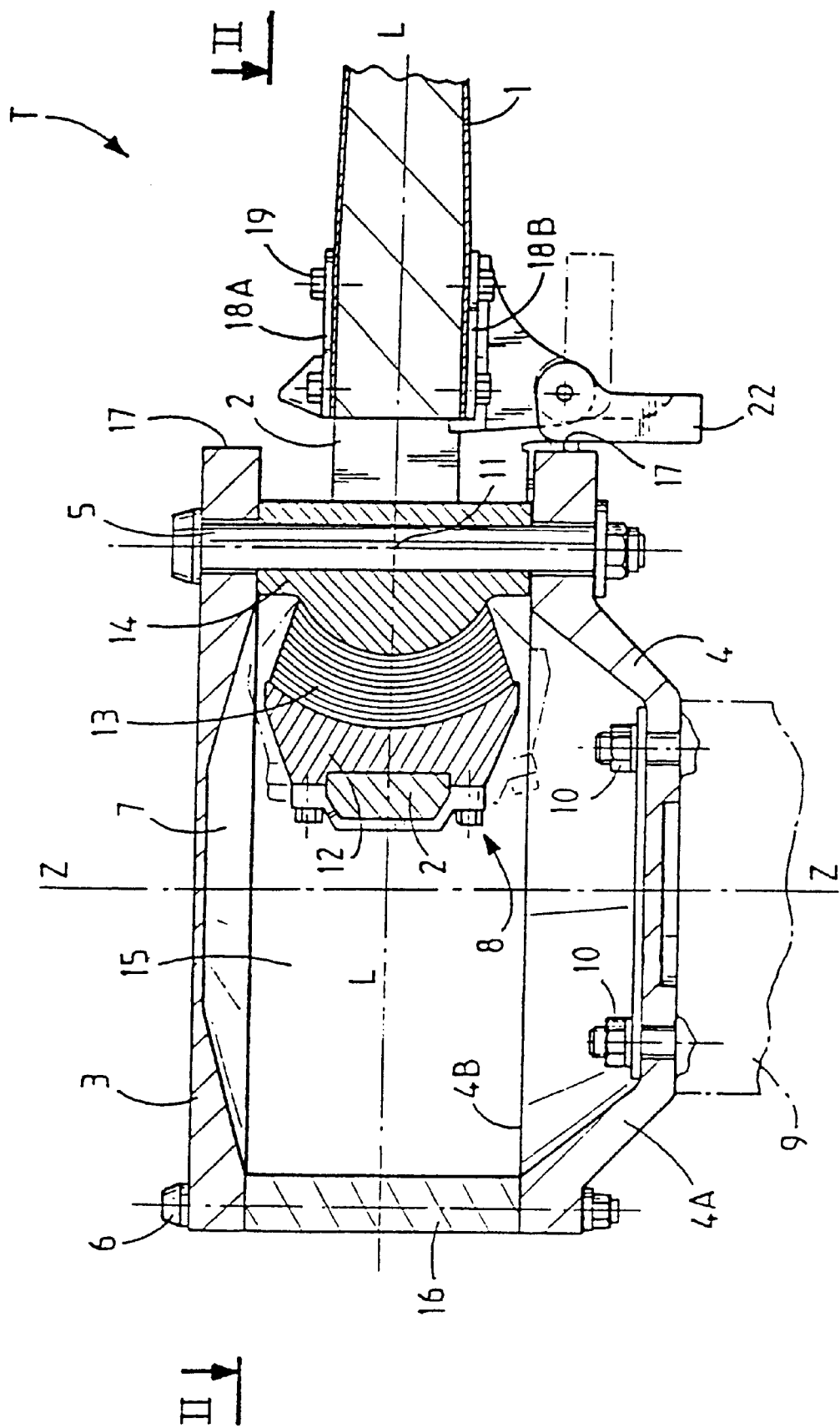
FIG. 1 is a partial view, in axial section, of an embodiment of the hub in accordance with the present invention, this section corresponding to line I—I of FIG. 2.
Figure 2:
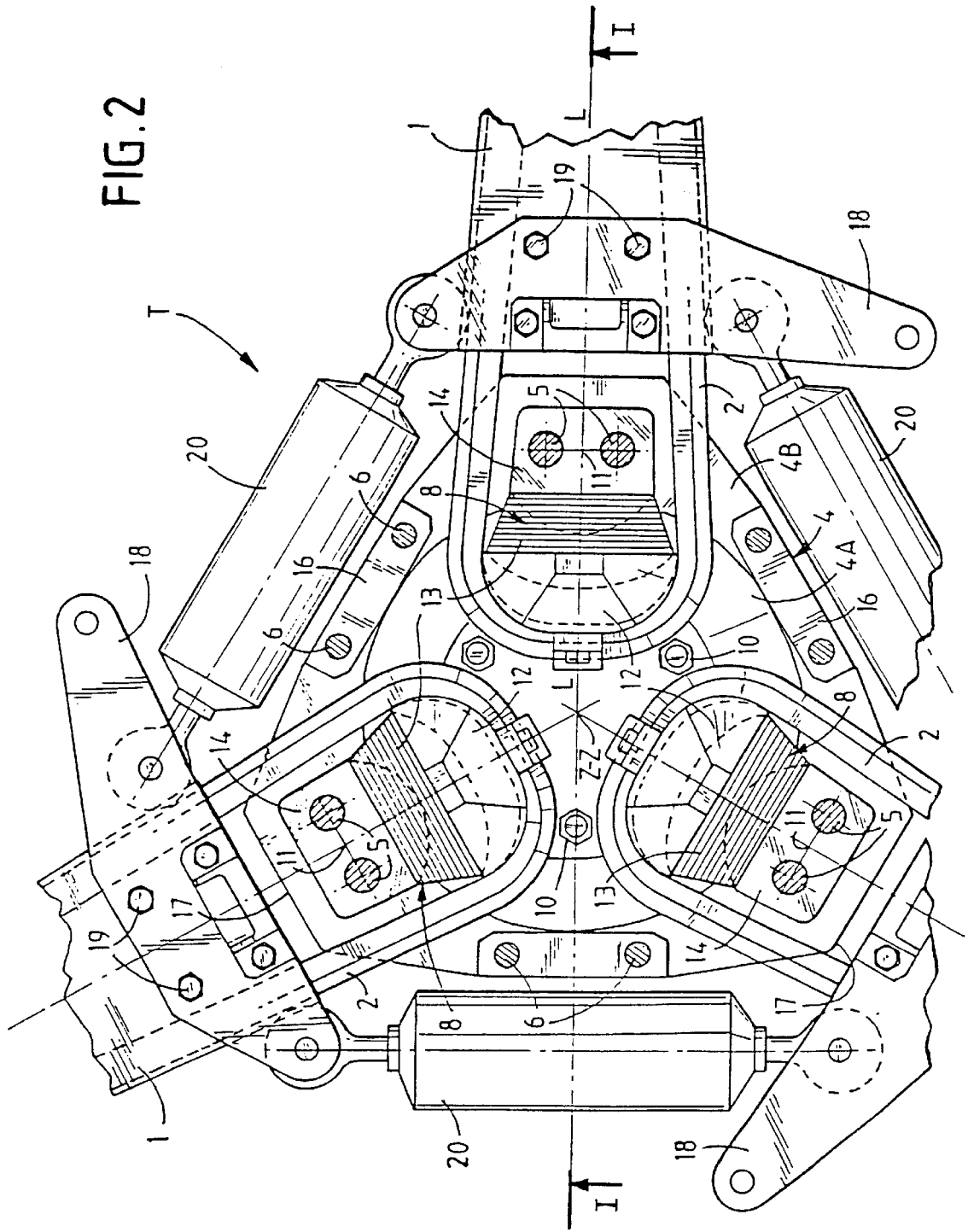
FIG. 2 is a top view of the hub of FIG. 1, in which said upper plate is assumed to be removed, this view corresponding to a section along the line II—II of FIG. 1.

The rotor head T for a rotary-wing aircraft, represented in FIGS. 1 and 2, comprises three blades regularly distributed around the axis of rotation Z-Z of said rotor head and represented only by their root 1 (in FIG. 1, a single blade root 1 is represented for clarity of the drawing). The root 1 of each of said blades is provided with a rigid loop 2 constituting the attachment of the corresponding blade onto the hub of said rotor head and integral with the spar of said blade.

The hub comprises an upper plate 3 and a lower plate 4 forming two separate components assembled together by means of bolts 5 or 6.

The upper plate 3 includes a central recess 7, while the lower plate 4 includes a frustoconical bowl-shaped central part 4A, open toward the upper plate 3 and projecting downward, said bowl 4A being surrounded by a flat peripheral rim 4B. The bowl 4A serves for fixing said rotor head onto its rotary shaft 9, by means of bolts 10.

In order to fix and articulate each blade on the hub, laminated spherical stops 8 of a known type are provided, the centre of rotation 11 of which lies on the axis L—L of the corresponding blade, these spherical stops serving as the sole articulation in flapping, in drag and in pitch.

The laminated spherical stops 8 each include an inner armature 12 in which the attaching loop 2 of the corresponding blade is embedded in a known way, an alternating stack 13 of rigid cups and layers of an elastic material in the form of a spherical portion, and an outer armature 14. Each spherical stop 8 is surrounded by the loop 2 of the associated blade.

Figure 3:
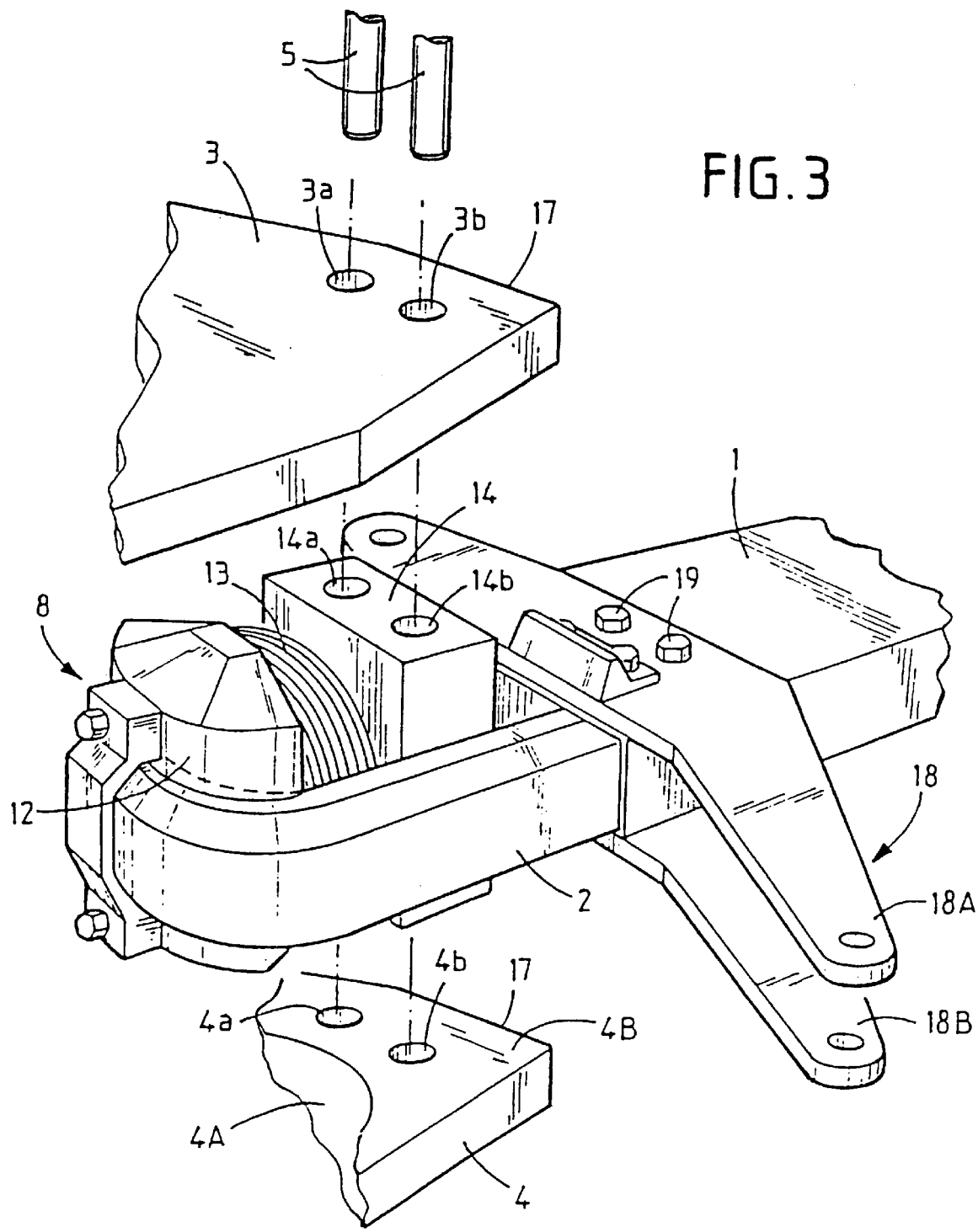
FIG. 3 is a diagrammatic view in perspective illustrating the assembling of said hub.

According to an important feature of the present invention, the outer armatures 14 of said laminated spherical stops 8 serve as spacers for the upper 3 and lower 4 plates, which between them define a space 15 in which said spherical stops 8 are housed. The outer armatures 14 thereof are arranged at the periphery of said plates 3 and 4 and are each traversed by two bolts 5. To that end, said outer armatures 14 are pierced with bores 14a and 14b coming into correspondence, respectively, with piercings 3a and 3b formed in the periphery of the upper plate 3 and with piercings 4a and 4b formed in the flat peripheral rim 4B of the lower plate 4. Moreover, at the periphery of said plates, spacers 16 are arranged, each traversed by two bolts 6, also traversing the plate 3 and the flat peripheral rim 4A of the plate 4 (see FIG. 3).

Hence, the hub in accordance with the present invention consists of plates 3 and 4, assembled together by being bolted, with outer armatures 14 and spacers 16 interposed.

In the example represented in FIGS. 1 and 2, the rotor head includes three blades and each of said plates 3 and 4 exhibits the general shape of a triangle with cut-off corners 17, each of the outer armatures 14 being located close to such a cut corner. In this case, the spacers 16 are arranged along the sides of said triangles, between two peripherally consecutive outer armatures 14.

Each blade root 1 is provided with a blade lever 18 consisting of two plates 18A and 18B arranged on either side of said corresponding blade root 1, and fixed to the latter by bolts 19. Each blade lever 18 is articulated to a pitch control rod, not represented.

In a known way, the rotor head in accordance with the present invention may include drag dampers 20, of the visco-elastic or hydraulic type.

In FIG. 2, the mounting of these drag dampers 20 between the blades has been illustrated, each damper linking the blade levers 18 of two consecutive blades.

Figure 4:
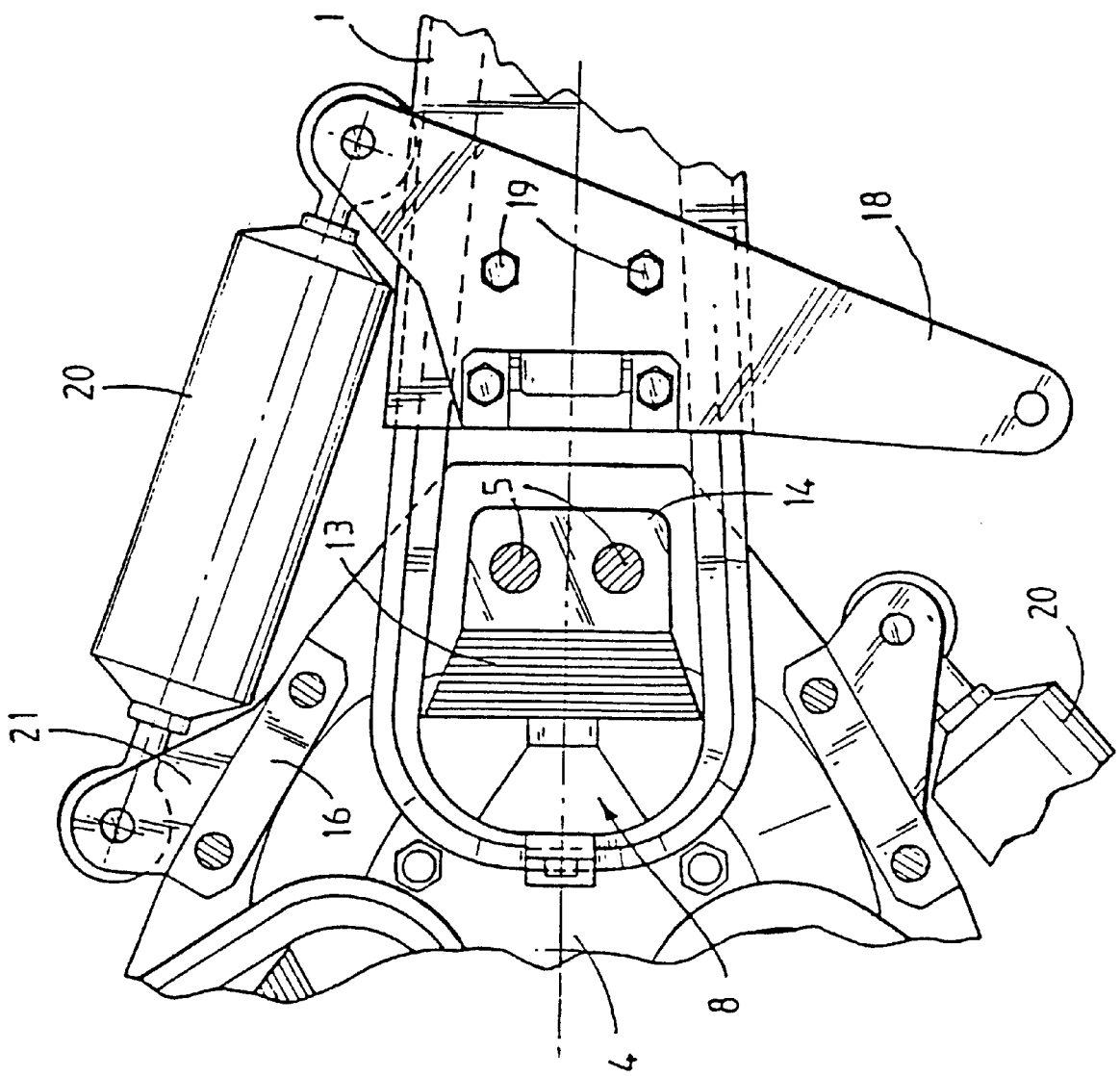
FIG. 4, in a partial view corresponding to FIG. 2, illustrates a variant embodiment of the rotor head in accordance with the present invention.

On the other hand, in FIG. 4, a drag damper 20 linking a blade lever 18 to the hub of said rotor head has been represented. In this case, the stops 16 may include an attaching lug 21, intended for one end of a drag damper.

Moreover, the blade levers 18 may carry centrifugal stops 22, capable of interacting with the edge of the cut corners 17.

It can easily be seen from the foregoing that half the drive torque of the rotor passes from the lower plate 4 to the upper plate 3 via the assembly of the two plates by means of the outer armatures 14 of the spherical stops 8 and the spacers 16. The lift forces and the movements due to the flapping of the blades pass solely through the lower plate, while the centrifugal forces originating from the blades are distributed between the two plates 3 and 4.

It will be noted that, in the present invention, the direct blade-to-blade link via a drag damper 20, very close to the hub, is possible, with three blades, only because the flapping-pitch coupling (link k) of the invention makes it possible to move away the pitch control rods (not represented) so as to free the space necessary for the drag dampers 20.

This arrangement makes it possible to obtain maximum compactness for the hub, and consequently reduced drag and mass.

Moreover, this arrangement, combined with the reduction in the distance between the center of the hub and the stops 8, makes it possible to alter the setting of the non-rotating cyclic plate (not represented) and, with a moderate inclination of the blade rods, to make the arrival of the control rods on this plate symmetric with respect to the mid-plane of the aircraft. This makes it possible to eliminate control bellcranks on the transmission support platform, with control rods going directly from the combiner situated at the bottom of the rear partition of the cabin to the cyclic plate.

The combination of these various means consequently makes it possible:

to have a particularly compact and particularly light hub, by virtue of the stops being brought close to the hub center where there is no longer a shaft, and by virtue of the positioning of the dampers very close to the hub, above all in the inter-blade link embodiment variant;

to simplify the controls (no control relay on the transmission support platform), by virtue of the compactness of the hub, of the flapping-pitch coupling and of the inclination of the pitch rods.

Moreover, the flapping-pitch coupling of the invention improves the behaviour of the aircraft from the point of view of stability and of entry into autorotation and the inclination of the pitch rods, by virtue of the pitch-drag coupling, affords favourable aerodynamic damping from the point of view of ground-air resonance.

What is claimed is:

1. A hub for a rotor head of a rotary-wing aircraft, said aircraft comprising at least two blades each of which is linked radially to said hub by a blade root provided with a rigid loop constituting an attachment of each of the blades onto said hub, laminated spherical stops carried by said hub and each of which is associated with an associated one of said blades and comprises, between an outer armature rigidly linked to said hub and an inner armature linked to the root of said blade, an alternating stack of rigid cups and layers of an elastic material in a form of spherical portions having a common center, each laminated spherical stop, for the associated blade, constituting an element for retaining on said hub and a single articulation in flapping, drag and pitch, and said rigid loop of a blade surrounding the associated laminated spherical stop and being integral with the inner armature of this latter stop, wherein said hub comprises an upper plate and a lower plate forming two separate components assembled to one another with the outer armatures of said spherical stops being interposed, so that said upper and lower plates are spaced from one another and define between them a space in which said spherical stops are housed, said outer armatures being arranged at a periphery of said plates and being traversed by fixing means integrating together said plates and said spherical stops.

2. A hub according to claim 1, including spacers arranged at the periphery of said plates, between said outer armatures, and which are integral with said plates.

3. A hub according to claim 2 for a 3-blade rotor head, wherein each of said plates has a triangular shape with cut-off corners, and each of said outer armatures is arranged in the vicinity of one of the cut-off corners, and said spacers are arranged along the sides of said triangular-shaped plates.

4. A hub according to claim 1 wherein said lower plate includes a bowl-shaped central part open toward said upper plate, and a peripheral rim on which said outer armatures of said stops are mounted.

5. A hub according to claim 2, wherein said spacers are mounted on a peripheral rim of the lower plate on which said outer armatures of said stops are mounted.

6. A hub according to claim 1, wherein said upper plate is hollowed-out centrally, opposite said lower plate.

7. A hub according to claim 1, wherein said plates are produced from a light alloy.

8. A hub according to claim 1, wherein said plates are produced from composite material.

9. A rotor head for rotary-wing aircraft, including:

a hub;

at least two blades, each of which is linked radially to said hub by a blade root which is provided with a rigid loop constituting the attachment of the blade onto said hub;

laminated spherical stops, each of which is associated with one blade and comprises, between an outer armature rigidly linked to said hub and an inner armature linked to the root of said blade, an alternating stack of rigid cups and layers of an elastic material in the form of spherical portions having a common center, each laminated spherical stop, for the associated blade, constituting an element for retaining on said hub and a single articulation in flapping, drag and pitch, and said rigid loop of a blade surrounding the associated laminated spherical stop and being integral with the inner armature of this latter stop, wherein said hub comprises an upper plate and a lower plate forming two separate components assembled to one another with the outer armatures of said spherical stops being interposed, so that said plates are spaced from one another and define between them a space in which said spherical stops are housed, said outer armatures being arranged at a periphery of said plates and being traversed by fixing means integrating together said plates and said spherical stops.

10. A rotor head according to claim 9, wherein said hub comprises at least one of:

(a) spacers arranged at the periphery of said plates, between said outer armatures, and made integral with said plates; and (b) said lower plate including a bowl-shaped central part open toward said upper plate, and a peripheral rim on which said outer armatures of said stops are mounted.

11. A rotor head according to claim 9, wherein each blade lever (18) consists of two plates arranged on either side of said blade root and fixed thereto.

12. A rotor head according to claim 11, including drag dampers, wherein each drag damper is arranged between the blade levers of two consecutive blades.

13. A rotor head according to claim 11, including drag dampers, wherein each drag damper is arranged between a blade lever of one blade and said hub.

14. A rotor head according to claim 13, provided with a hub in accordance with claim 2 including spacers arranged at the periphery of said plates and made integral with said plates, wherein said spacers include an attaching lug for attaching a drag damper onto the hub.

* * * * *